(12) United States Patent
Paul et al.

(10) Patent No.: US 6,213,253 B1
(45) Date of Patent: Apr. 10, 2001

(54) BRAKE JUDDER TESTING

(75) Inventors: Hans-Gunter Paul, Limburg (DE); Simon Mathew Hudson, Bilton; Philip Ferdani, Whaley Bridge, both of (GB)

(73) Assignee: Federal-Mogul Technology Limited, Rugby (GB)

( * ) Notice: Subject to any disclaimer, the term of this patent is extended or adjusted under 35 U.S.C. 154(b) by 0 days.

(21) Appl. No.: 09/341,604

(22) PCT Filed: Jan. 12, 1998

(86) PCT No.: PCT/GB98/00086

§ 371 Date: Jul. 14, 1999

§ 102(e) Date: Jul. 14, 1999

(87) PCT Pub. No.: WO98/30876

PCT Pub. Date: Jul. 16, 1998

(30) Foreign Application Priority Data

Jan. 14, 1997 (GB) .................................................. 9700584

(51) Int. Cl.[7] .................................................... F16D 66/00
(52) U.S. Cl. .................... 188/1.11 W; 188/85; 188/72.4; 73/130
(58) Field of Search ................................ 73/130; 188/85, 188/72.4, 1.11 R, 1.11 W

(56) References Cited

U.S. PATENT DOCUMENTS

| | | | |
|---|---|---|---|
| 4,266,633 | * | 5/1981 | Barabino et al. .............. 188/1.11 W |
| 4,677,420 | * | 6/1987 | Topic et al. ....................... 188/1.11 L |
| 4,850,454 | * | 7/1989 | Korody ............................. 188/1.11 L |
| 5,513,726 | * | 5/1996 | Thompson et al. .............. 188/1.11 L |
| 5,660,251 | * | 8/1997 | Nishizawa et al. ................ 188/73.35 |
| 5,687,818 | * | 11/1997 | Nishizawa et al. ................ 188/73.35 |
| 5,848,672 | * | 12/1998 | Brearley et al. ................. 188/1.11 L |
| 5,848,673 | * | 12/1998 | Strauss et al. ................... 188/1.11 L |

FOREIGN PATENT DOCUMENTS

| | | |
|---|---|---|
| 4 324 620 | 1/1995 | (DE) . |
| 0 319 745 | 6/1989 | (EP) . |
| 911363 | 11/1962 | (GB) . |
| 58-105031 | 6/1983 | (JP) . |
| 62-832 | 1/1987 | (JP) . |
| 6-288848 | 10/1994 | (JP) . |
| 8-93807 | 4/1996 | (JP) . |

\* cited by examiner

*Primary Examiner*—Christopher P. Schwartz
*Assistant Examiner*—Devon Kramer
(74) *Attorney, Agent, or Firm*—Synnestvedt & Lechner LLP

(57) ABSTRACT

A disc brake testing apparatus comprises operating means operable to operate pad moving means of the disc brake to urge pads of the brake towards the disc thereof. The operating means operable to urge the pads against the disc with a higher pressure sufficient to cause the pads to maintain constant contact with the disc and apply a significant braking force thereto. In order to simulate conditions which cause disc thickness variation, the operating means is alternatively operable to urge the pads against the disc with a lower pressure selected to cause the pads to make intermittent contact with the disc during each revolution of the disc.

4 Claims, 1 Drawing Sheet

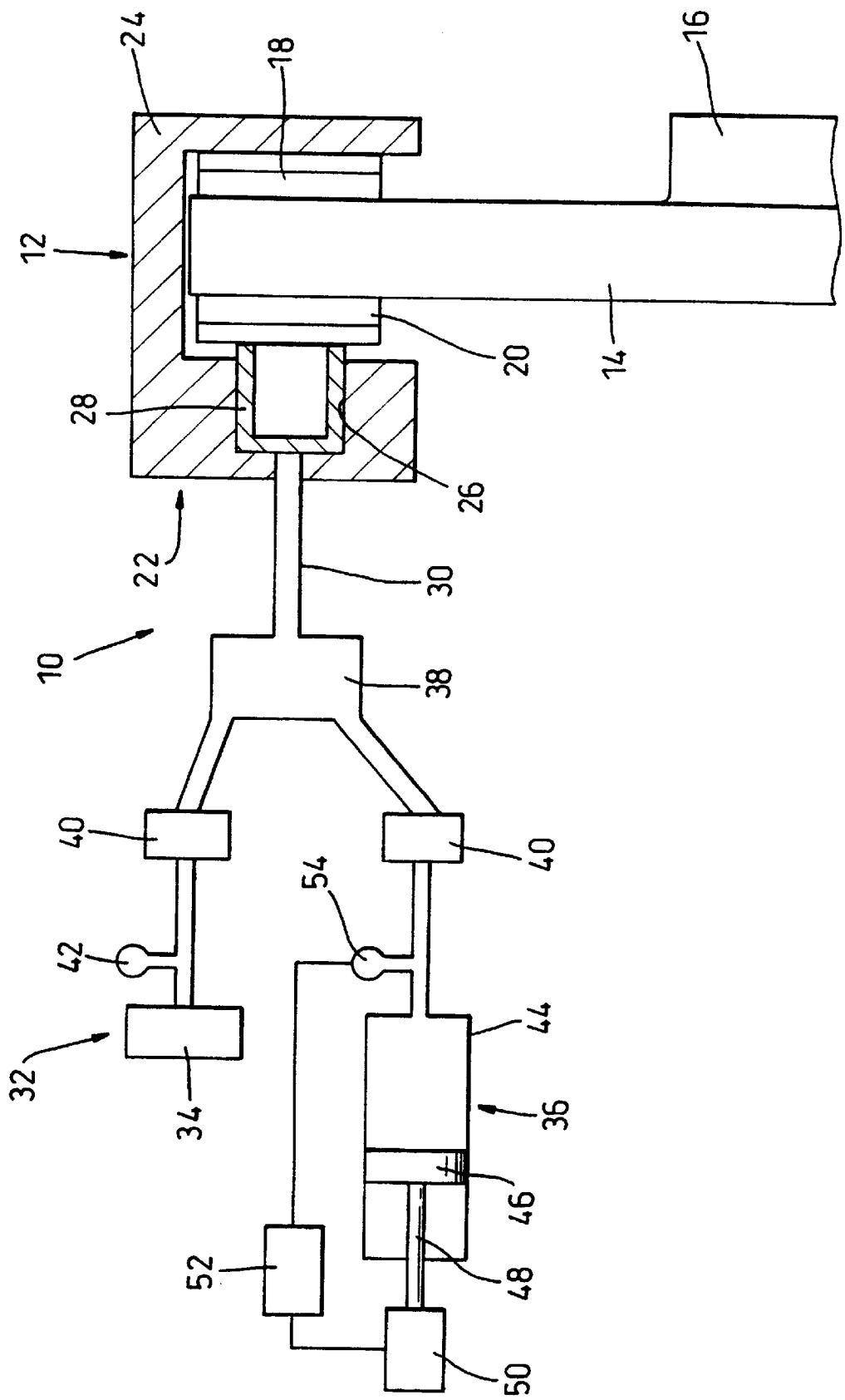

BRAKE JUDDER TESTING

BACKGROUND OF INVENTION

This invention is concerned with the testing apparatus for disc brakes.

FIELD OF THE INVENTION

A disc brake comprises a disc which rotates with a hub, two brake pads positioned on opposite sides of the disc, and pad moving means operable to cause the pads to be urged against the disc into a "brakes on" condition in which they apply significant braking forces to the disc. The pad moving means is often a calliper mechanism which often comprises a hydraulically-operated piston and cylinder assembly. Disc brakes normally do not provide for the pads to be pulled fully away from the disc after a brake application. Instead, when the pad moving means ceases to urge the pads against the disc, the pads are "knocked" away by the disc into a "brakes off" condition in which the pads are close to the disc but out of contact therewith.

SUMMARY OF THE INVENTION

In designing disc brakes, eg to select a combination of materials to form the disc and the pads, it is conventional to carry out testing programmes in which the disc brake is mounted on a testing apparatus (commonly called a dynamometer) and operated repeatedly so that measurements of performance and wear can be taken. Conventionally, such a testing apparatus is equipped with operating means operable to operate the pad moving means so that the brake alternates between its "brakes on" and "brakes off" conditions. Where the pad moving means operates hydraulically, the operating means varies the pressure of hydraulic fluid between a high pressure, eg about 30 bar, which causes the "brakes on" condition and substantially no pressure which allows the "brakes off" condition to occur. Repeated operation of the operating means simulates the application of the brakes in normal use. Hitherto, however, such testing apparatus has not been efficient in detecting whether a disc brake is susceptible to the phenomenon known as "brake judder".

Brake judder occurs when a disc has an uneven thickness. Such uneven thickness results from parts of the disc intermittently contacting the pads when the brakes are in the "brakes off" condition. Conventional dynamometers do not control the position of the pads during the "brakes off" condition so that the possibility of disc thickness variation occurring is somewhat random and tests are not reliably repeatable.

It is an object of the present invention to provide a disc brake testing apparatus which is efficient at detecting whether a disc brake is susceptible to brake judder.

The invention provides a disc brake testing apparatus comprising operating means operable to operate pad moving means of the disc brake to cause the moving means to urge pads of the brake towards the disc thereof, the operating means being operable to urge the pads against the disc with a higher pressure sufficient to cause the pads to maintain constant contact with the disc and apply a significant braking force thereto, characterised in that the operating means is alternatively operable to urge the pads against the disc with a lower pressure selected to cause the pads to make intermittent contact with the disc during each revolution of the disc.

In an apparatus according to the invention, when the operating means operates with said lower pressure, the pads do not significantly brake the disc but make intermittent contact therewith (due to run-out, ie axis wobble, or disc thickness variation), thereby simulating, in a controlled and reproducible manner, the conditions which give rise to disc thickness variation. Said lower pressure has to be selected to suit the particular brake but pressures below 1 bar are suitable, eg 0.4 to 0.1 bar. Any disc thickness variation caused can then be measured after the test.

A testing apparatus according to the invention may also comprise monitoring means operable to monitor displacements of the pads, when the operating means operates with said lower pressure. Such monitoring means may, for example, detect variations in the pressure applied by the operating means. Such monitoring means can detect whether intermittent contact is occurring and, hence, whether said lower pressure requires adjustment.

Conveniently, a testing apparatus according to the invention comprises operating means comprising a high pressure fluid supply which is arranged to supply said higher pressure, and a low pressure supply which is arranged to supply said lower pressure. This arrangement avoids constant adjustment of the pressure of a single fluid supply. The pressures supplied by the high and low pressure fluid supplies will be different in different circumstances but, typically, said high pressure supply operates at about 30 bar and the low pressure supply at less than 1 bar, eg about 0.4 bar.

Where the operating means comprises low and high pressure fluid supplies, preferably, the operating means may be operable to adjust said lower pressure by altering the volume occupied by the fluid. For example, the operating means may alter said volume by operating a stepper motor or other servo device.

There now follows a detailed description, to be read with reference to the accompanying drawing, of a testing apparatus which is illustrative of the invention.

BRIEF DESCRIPTION OF THE DRAWINGS

The drawing is a diagrammatic view of a portion of the illustrative apparatus.

DETAILED DESCRIPTION OF THE INVENTION

The illustrative disc brake testing apparatus 10, shown in the drawing, is arranged to test a disc brake 12 which comprises a disc 14 which rotates with a hub 16, two brake pads 18 and 20 positioned on opposite sides of the disc, and pad moving means 22 operable to cause the pads to be urged against the disc. The pad moving means 22 is in the form of a calliper mechanism which comprises a bridge member 24 mounted for sliding movement in a direction parallel to the axis about which the disc 14 rotates. The bridge member 24 has the pad 18 mounted directly thereon so that the pad 18 extends parallel to one side surface of the disc 14. On the opposite side of the disc 14 to the pad 18, the bridge member 24 defines a cylinder 26 in which a piston 28 is movable. The piston 28 engages the pad 20 which also extends parallel to a side surface of the disc 14. When hydraulic fluid under pressure is introduced into the cylinder 26 through a pipe 30, the piston 28 is urged out of the cylinder 26 and urges the pad 20 against the disc 14. Movement of the piston 28 also causes sliding of the bridge member 22, in the opposite direction, thereby urging the pad 18 against the disc 14.

The apparatus 10 also comprises operating means 32 operable to operate the pad moving means 22 of the disc brake 12 to cause the moving means to urge the pads 18 and 20 towards the disc 14. The operating means 32 comprises a high pressure fluid supply 34, a low pressure fluid supply 36, and a manifold 38 which connects the pipe 30 to the supply 34, or to the supply 36. An isolation valve 40 is located between each of the supplies 34 and 36 and the manifold 38. When the supply 34 is connected to the manifold 38, the supply 36 is isolated therefrom and vice versa.

The high pressure supply 34 comprises a diaphragm cylinder and can supply a pressure of 100 bar but normally operates at about 30 bar. When the supply 34 is connected to the pipe 30, the operating means 32 is operable to urge the pads 18 and 20 towards the disc 14 with a higher pressure sufficient to cause the pads to maintain constant contact with the disc and apply a significant braking force to the disc 14. A pressure indicator 42 is associated with the supply 34.

The low pressure supply 36 comprises a cylinder 44, a piston 46 movable in the cylinder 44, a piston rod 48 connected to the piston 46, and a stepper motor 50 operable to move the piston rod 48 and, hence, the piston 46 within the cylinder 44. Operation of the motor 50 moves the piston 46 to determine the pressure of hydraulic fluid in the cylinder 44 and, when the supply 36 is connected to the pipe 30, this determines the pressure in the pipe 30 and the cylinder 26. The supply 36 can supply a pressure up to 1 bar and normally operates at about 0.4 bar. When the supply 36 is connected to the pipe 30 by the manifold 38, the operating means 32 is operable to urge the pads 18 and 20 against 14 the disc with a lower pressure selected to cause the pads to make intermittent contact with the disc 14 during each revolution of the disc, ie the pads rest on the disc until displaced and are returned to rest on the disc again. The pads 18 and 20 gently rest on the disc 14 unless displaced by pressure from the disc 14 which occurs due to thickness variation, or due to run-out of the disc about its axis of rotation. When the pads 18 and 20 are knocked away from the disc 14, they are gently returned thereto. In practice, this knocking away will flex the seals of the cylinder 26 rather than displacing the piston 28 relative to said seals.

The apparatus 10 also comprises monitoring means 52 operable to monitor displacements of the pads 18 and 20 from the disc 14 when the operating means operates with said lower pressure. The monitoring may be utilised to maintain said lower pressure at a predetermined value or may be utilised to determine whether intermittent contact is occurring. The monitoring means 52 is a computer which receives feedback of the pressure in the supply 36 from a pressure detector 54. The monitoring means should detect a pressure variation which, during each revolution of the disc 14, has at least one period of constant pressure (during which the pads are out of contact with the disc) and at least one period of increased pressure (during which the pads contact the disc). If conditions of intermittent contact are not observed, the monitoring means can operate the motor 50 to adjust the volume until intermittent contact conditions are established. Thus, the operating means 32 is operable, in response to variations detected in the pressure of fluid in the low pressure supply 36, to alter the volume occupied by the fluid.

In the operation of the testing apparatus 10, the disc brake 12 is mounted on the apparatus and the stepper motor 50 is used to determine the pressure required in the cylinder 44 to just move the pads 18 and 20 into contact with the disc 14. This pressure is used as said lower pressure. This pressure varies from brake to brake due to such factors as the stiffness of seals. The disc 14 is then rotated and the moving means 22 is operated to create "brakes on" conditions with the supply 34 connected to the pipe 30, or conditions in which disc thickness variation may occur with the supply 36 connected. During these last-mentioned conditions, the monitoring means 52 checks that intermittent contact is occurring and operates the motor 50 to re-establish intermittent contact if it ceases, eg due to temperature increases.

What is claimed is:

1. A testing apparatus for testing a brake having a disc and pads and pad moving means, said apparatus comprising operating means operable to operate the pad moving means of the brake to cause the pad moving means to urge the pads of the brake towards the disc thereof, the operating means being operable to urge the pads against the disc with a higher pressure sufficient to cause the pads to maintain constant contact with the disc and apply a significant braking force thereto, wherein the operating means is alternatively operable to urge the pads against the disc with a lower pressure selected to cause the pads to make intermittent contact with the disc during each revolution of the disc, wherein the apparatus comprises operating means comprising a high pressure fluid supply which is arranged to supply said higher pressure, and a low pressure supply which is arranged to supply said lower pressure.

2. An apparatus according to claim 1, wherein the apparatus also comprises monitoring means operable to monitor displacements of the pads, when the operating means operates with said lower pressure.

3. A testing apparatus according to claim 1, wherein the operating means is operable to adjust said lower pressure by altering the volume occupied by the fluid.

4. A testing apparatus according to claim 3, wherein the operating means alters said volume by operating a stepper motor or other servo device.

* * * * *